United States Patent

Kenney, Jr. et al.

Patent Number: 5,967,673
Date of Patent: Oct. 19, 1999

[54] AXIALLY ORIENTED ANTI-ROTATION FEATURE FOR LIPPED THRUST RACES

[75] Inventors: Joseph F. Kenney, Jr., Winsted, Conn.; Wolfgang Knoll, Schorndorf, Germany

[73] Assignee: The Torrington Company

[21] Appl. No.: 09/032,591

[22] Filed: Feb. 27, 1998

Related U.S. Application Data

[60] Provisional application No. 60/041,599, Mar. 17, 1997.

[51] Int. Cl.[6] .................................................... F16C 33/58
[52] U.S. Cl. ............................................ 384/620; 384/622
[58] Field of Search .................................... 384/621, 622, 384/620, 615, 617

[56] References Cited

U.S. PATENT DOCUMENTS 1,326,892 12/1919 Reynolds .
4,042,285 8/1977 Dorsch .
4,046,432 9/1977 Hofmann et al. .
4,981,373 1/1991 Bando .
5,482,384 1/1996 Lyle .
5,647,675 7/1997 Metten et al. .

*Primary Examiner*—Lenard A. Footland
*Attorney, Agent, or Firm*—John C. Bigler

[57] ABSTRACT

A thrust washer formed from metal sheet has a flat, ring-shaped thrust portion oriented radially, an axially oriented circumferential lip extending along one of the inner and the outer diameters of the thrust portion, and a tab extending from the circumferential lip. The tab includes a radially oriented mid-portion and at least one wing-portion extending perpendicular to the mid-portion and parallel to the axis of the thrust portion such that a flat surface of the wing-portion may engage a recess of a backup member to prevent rotation of the thrust washer relative to the backup member.

4 Claims, 2 Drawing Sheets

AXIALLY ORIENTED ANTI-ROTATION FEATURE FOR LIPPED THRUST RACES

This Application claims the benefit of U.S. Provisional Application No. 60/041,599 filed Mar. 17, 1997.

BACKGROUND OF THE INVENTION

This invention relates generally to thrust bearings and, more particularly, to a lipped thrust washer having an anti-rotation feature.

Thrust bearings with rollers are intended to transmit thrust through the rollers, rolling on raceways of two opposed thrust washers, without sliding of the thrust washers along their respective backup surfaces. Such sliding may be a problem, particularly when a backup surface is made of a material that is softer than the preferred hardened steel, such as unhardened steel, aluminum or even plastic, for example. In such applications, a simple tab extending radially outwardly from the thrust washer would cut into the backup material rather than prevent relative rotation. Accordingly, there is a need for a thrust washer with an anti-rotation device suitable for relatively soft backup materials.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the invention, this is accomplished by providing a thrust washer formed from metal sheet and comprising a flat, ring-shaped thrust portion oriented radially and including a raceway for rollers, an axially oriented circumferential lip extending along one of the inner and the outer diameters of the thrust portion, and a tab extending from the circumferential lip. The tab includes a radially oriented mid-portion and at least one wing-portion extending perpendicular to the mid-portion and parallel to the axis of the thrust portion such that a flat surface of the wing-portion may engage a recess of a backup member to prevent rotation of the thrust washer relative to the backup member.

The foregoing and other aspects will become apparent from the following detailed description of the invention when considered in conjunction with the accompanying drawing figures.

BRIEF DESCRIPTION OF THE DRAWING FIGURES

FIG. 1 is an axial view illustrating a first embodiment of the thrust bearing of the present invention;

FIGS. 2 and 5 are sectional views of the embodiment of FIG. 1 taken along the lines 2—2 and 5—5, respectively;

FIGS. 3 and 4 are inside and outside views of the embodiment of FIG. 1 taken along the lines 3—3 and 4—4, respectively;

FIG. 6 is an axial view illustrating a second embodiment of the thrust bearing of the present invention;

FIGS. 7 and 10 are sectional views of the embodiment of FIG. 6 taken along the lines 7—7 and 10—10, respectively; and FIGS. 8 and 9 are outside and inside views of the embodiment of FIG. 6 taken along the lines 8—8 and 9—9, respectively.

DETAILED DESCRIPTION

Figure 1:
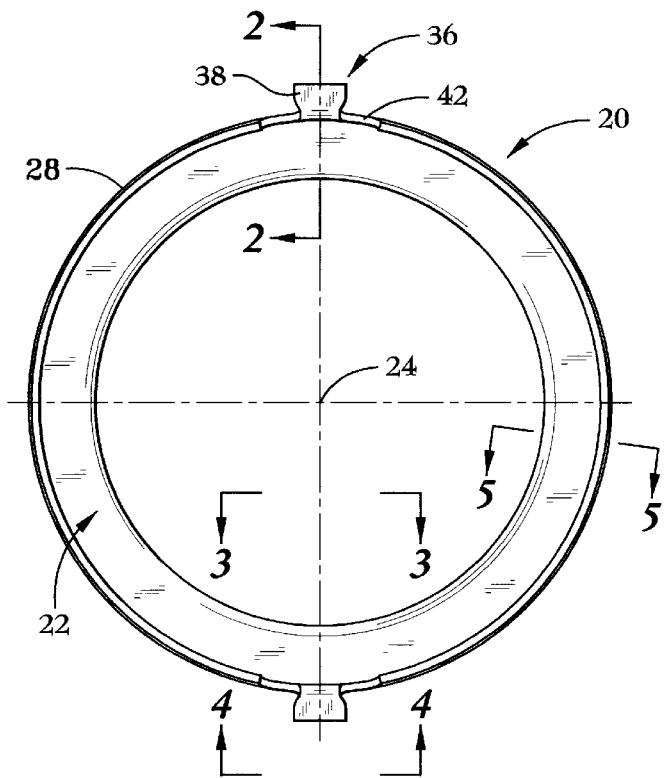
Figure 2:
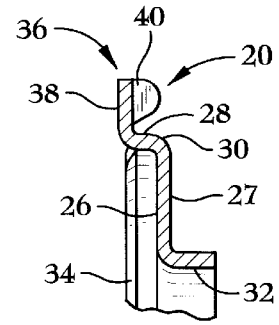
Figure 5:
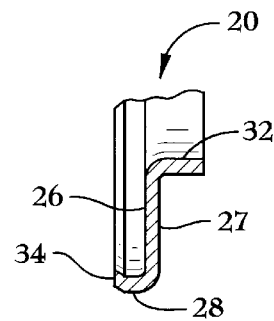
Figure 3:
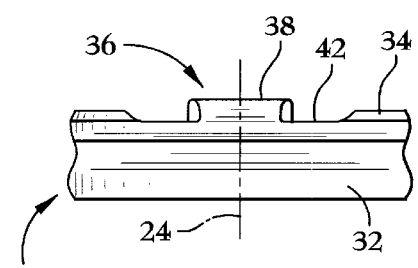
Figure 4:
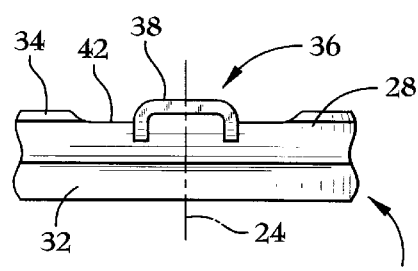
Figure 6:
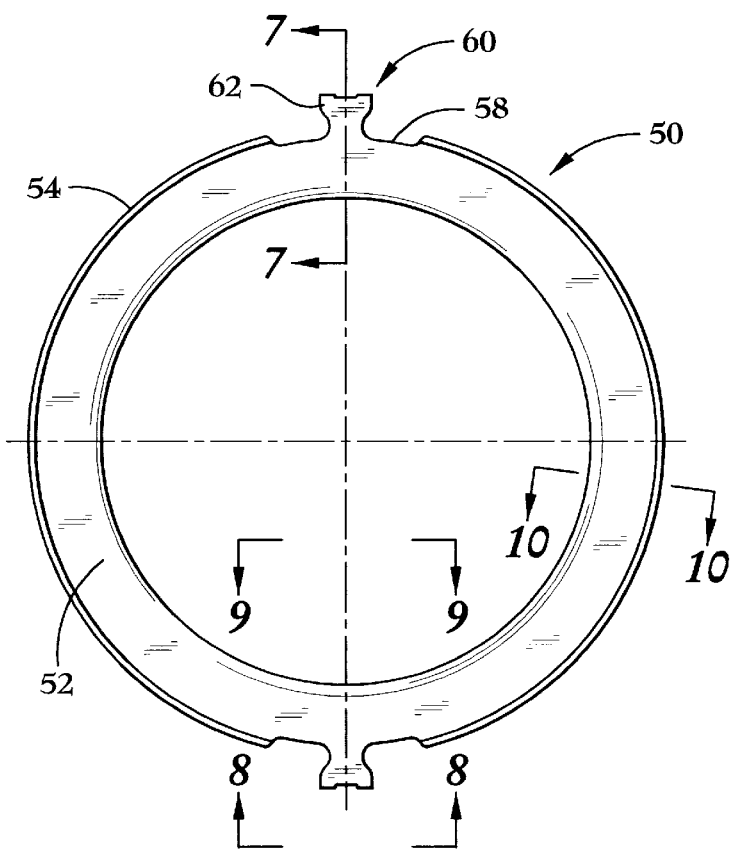
Figure 7:
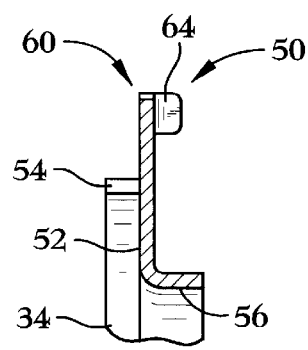
Figure 10:
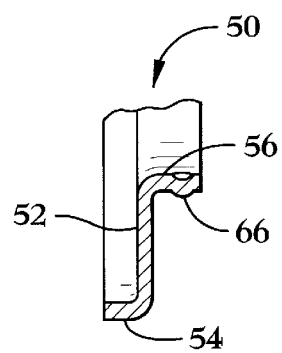
Figure 8:
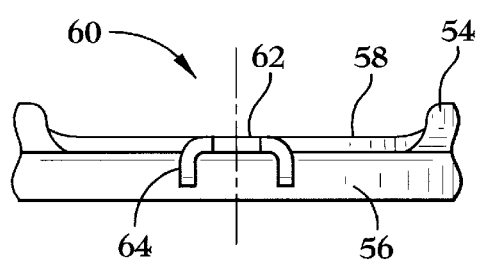
Figure 9:
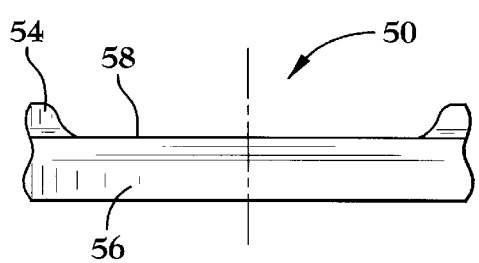

Referring now to the drawings, FIGS. 1 through 5 illustrate a thrust washer 20 formed from sheet metal according to the present invention. A flat, ring-shaped thrust portion 22 is oriented radially, that is, oriented perpendicular with respect to axis 24 of the thrust portion 22. As shown in FIG. 2, thrust portion 22 includes a raceway 26 on one flat side and a backup surface 27 on the other flat side. It should be understood that the thrust washer 20 is to be used with caged rollers positioned between the raceway 26 and a raceway of an opposing thrust washer, not shown.

An axially oriented circumferential lip 28 extends along the outer diameter of the thrust portion 22. In the forming operation, those two portions of the thrust washer may be joined by a radiused portion 30, as shown in FIG. 2. If desired, an optional axially oriented circumferential lip 32 may extend along the inner diameter of the thrust portion 22. Although not required for the present invention, the circumferential lip 32 may include a curl 34 or dimples for retaining the cage of the rollers axially, to allow the thrust bearing to be held together as an assembly.

A tab 36 extends from the circumferential lip 28 and includes a radially oriented mid-portion 38 and at least one wing-portion 40 extending perpendicular to the mid-portion and parallel to the axis 24. Thus, the wing-portion 40 presents a flat, smooth surface to a recess of a backup member, not shown, to prevent rotation of the thrust washer 20 relative to the backup member. The circumferential lip 28 may be formed with a relief portion 42 having a reduced axial length adjacent to the tab 36 to facilitate forming of the tab 36 and to allow the mid-portion 38 and the axial end of the circumferential lip 28 to be substantially on the same plane perpendicular to the axis 24, as shown.

The tab 36 is illustrated as extending from the circumferential lip 28 that is along the outer diameter of the thrust portion 22. However, the present invention also includes a similar configuration, not shown, with the tab extending from a circumferential lip that is along the inner diameter of the thrust portion. Additionally, the present invention also includes configurations in which the tab extends from a circumferential lip that extends either axially inwardly (towards the caged rollers and the opposing thrust washer, as illustrated by circumferential lip 28) or axially outwardly (as illustrated by circumferential lip 32).

FIGS. 6 through 10 illustrate a thrust washer 50 formed from sheet metal according to the present invention and having a thrust portion 52, a circumferential lip 54 along the outer diameter of the thrust portion 52, and a circumferential lip 56 along the inner diameter of the thrust portion 52. Although generally similar to the first embodiment described above, the thrust washer 50 has relief portions 58 within the circumferential lip 54 that are larger than relief portions 42. That is, the relief portions 58 extend further, axially, and go all the way to the base of the circumferential lip 54 and somewhat into the thrust portion 52, although not extending to the portion serving as a raceway for the rollers.

As a result of the relief portions 58, a tab 60 is moved axially inwardly to a location recessed within the axial end of the circumferential lip 54 to the plane of the thrust surface 52. This is in contrast to the relief portions 42 of the first embodiment that allowed the tab 36 to be moved axially inwardly to a location substantially on the plane of the axial end of the circumferential lip 28. It should be understood that the present invention includes various configurations having no relief portions and progressing through configurations having larger and larger relief portions to the large relief portions 58 illustrated.

The tab 60 is similar to the tab 36 in that it includes a radially oriented mid-portion 62 and at least one wing-portion 64 extending perpendicular to the mid-portion 62 and parallel to the axis of the thrust portion 52 such that a flat surface of the wing-portion 64 may engage a recess of a backup member to prevent rotation of the thrust washer 50 relative to the backup member. Although not required for the present invention, the circumferential lip 56 may include a plurality of circumferentially spaced dimples forming protrusions 66 for providing frictional retention upon a shaft, not shown.

The thrust washer of the present invention incorporates an anti-rotation device that is particularly beneficial when used in applications which utilize a backup surface which is softer than (the preferred) hardened steel. The winged tab of the present invention presents a larger and smoother anti-rotation surface than prior art devices and resists wearing or otherwise damaging of the engaging feature. The thrust washer may be designed to maintain the unbroken integrity of the portion of the axial lip closest to the formed radius, as illustrated in the FIGS. 1 through 5, to give the thrust washer greater resistance to warpage during heat treatment.

Having described the invention, what is claimed is:

1. A thrust washer formed from metal sheet and comprising:

a flat, ring-shaped thrust portion oriented radially, that is, oriented perpendicular with respect to an axis, and including a raceway for rollers;

an axially oriented circumferential lip extending along one of the inner and the outer diameters of the thrust portion; and a tab extending from the circumferential lip and away from the thrust portion, the tab including a radially oriented mid-portion and at least one wing-portion extending perpendicular to the mid-portion and parallel to the axis of the thrust portion such that a flat surface of the wing-portion may engage a backup member to prevent rotation of the thrust washer relative to the backup member.

2. A thrust washer according to claim 1, wherein the circumferential lip of the thrust washer includes a relief portion adjacent to the tab, the relief portion defined by a reduced axial length of the circumferential lip, and wherein the mid-portion of the tab and the axial end of the circumferential lip are substantially on the same plane perpendicular to the axis of the thrust washer.

3. A thrust washer according to claim 1, wherein the circumferential lip of the thrust washer includes a relief portion having a reduced axial length such that the mid-portion of the tab is recessed axially inwardly with respect to the axial end of the circumferential lip.

4. A thrust washer according to claim 3, wherein the relief portion extends to the thrust portion such that the mid-portion of the tab is in radial alignment with the thrust portion, that is, that the mid-portion and the thrust portion extend within the same plane perpendicular to the axis of the thrust washer.

* * * * *